United States Patent [19]

Houck

[11] 4,253,239
[45] Mar. 3, 1981

[54] LENGTH PROBE WITH TRACING UNIT AND SWITCH ARRANGEMENT

[75] Inventor: David J. Houck, Baltimore County, Md.

[73] Assignee: Electronic Modules Corporation, Timonium, Md.

[21] Appl. No.: 62,941

[22] Filed: Aug. 2, 1979

[51] Int. Cl.³ .............................................. G01B 3/12
[52] U.S. Cl. .............................. 33/141 R; 235/92 DN
[58] Field of Search ................. 33/141 R, 141 E, 142, 33/141.5, 125 M, 125 C; 235/92 DN, 92 MP, 92 MT; 364/560, 561, 562

[56] References Cited

U.S. PATENT DOCUMENTS

| 3,342,979 | 9/1967 | Wright et al. .................. 235/92 DN |
| 3,601,585 | 8/1971 | Paulsen .......................... 235/92 DN |

FOREIGN PATENT DOCUMENTS 1003960 1/1956 Fed. Rep. of Germany ........ 33/141 R

Primary Examiner—Harry N. Haroian
Attorney, Agent, or Firm—Reginald F. Pippin, Jr.

[57] ABSTRACT

A hand-held portable length probe having a length measuring wheel and a tracing unit disposed adjacent the measuring wheel, the tracing unit being slidably carried by the probe housing and acting to actuate a switch secured in fixed relation on the probe housing. The switch is illustrated as a miniature snap action switch, actuated by the slidable tracing unit either directly or indirectly through an intermediate adjustable spring lever arm; and is also illustrated as a magnetically actuated switch in the form of a reed switch which is actuated by a permanent magnet carried by the sliding tracing unit. The wheel is carried in a removable nose element which serves to aid in anchoring the tracing unit housing to the length probe main housing. The switch is carried, in the illustrative examples, by a retention clip.

23 Claims, 12 Drawing Figures

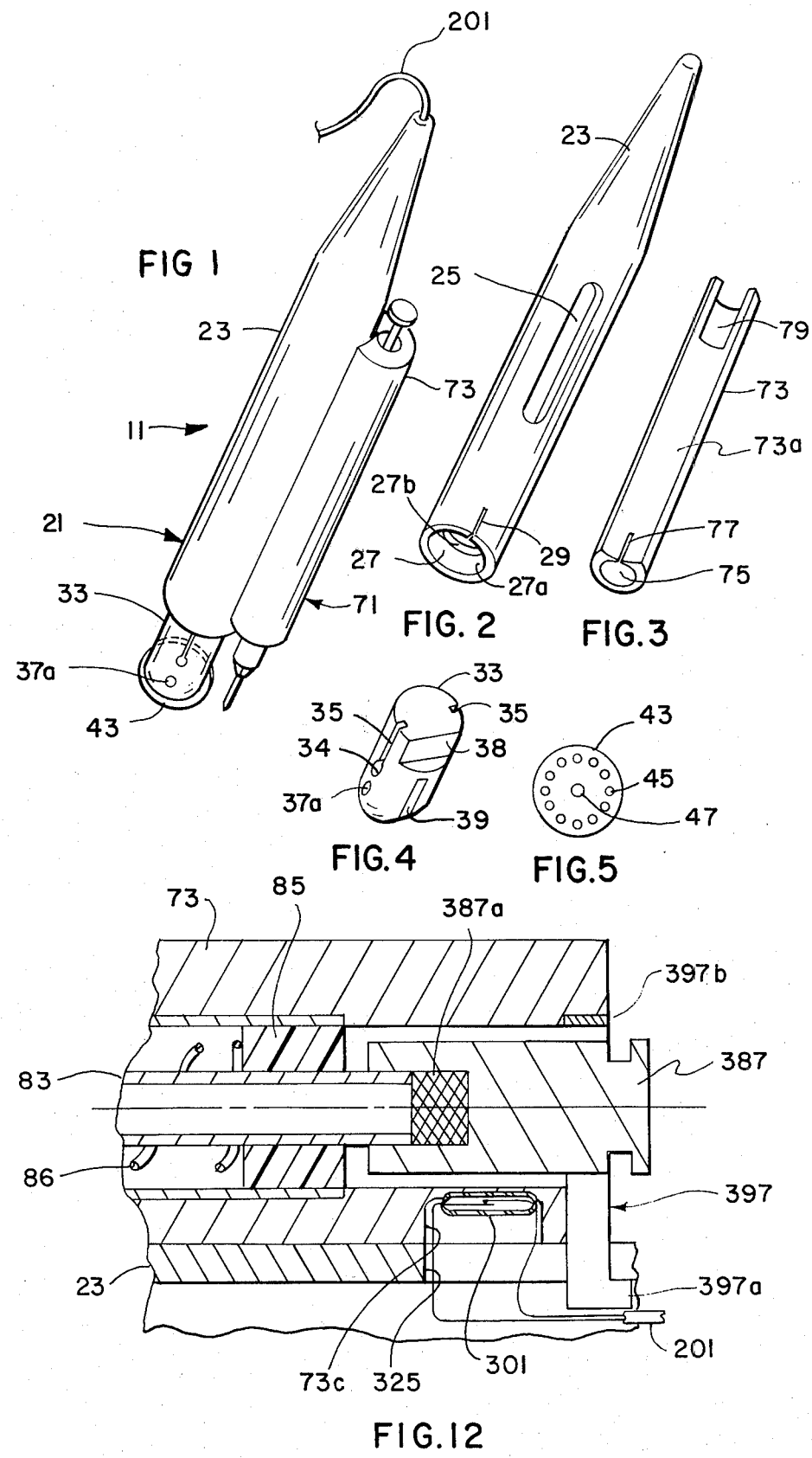

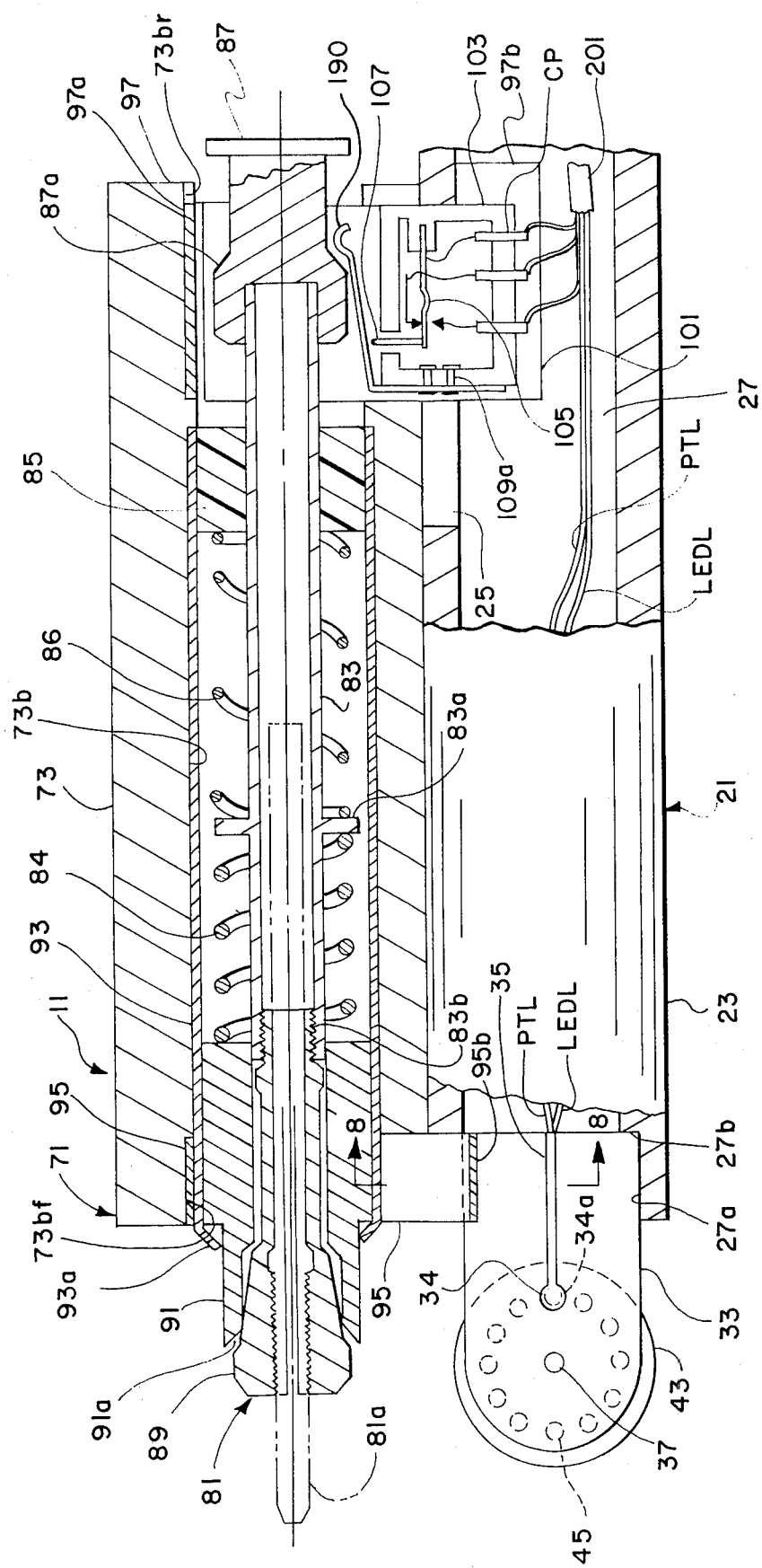

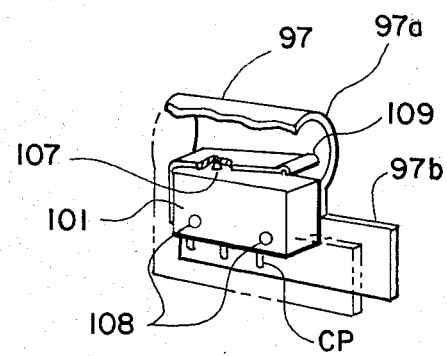
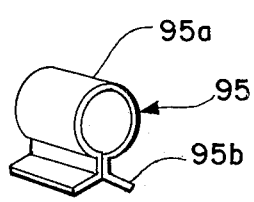
FIG.7  FIG.9
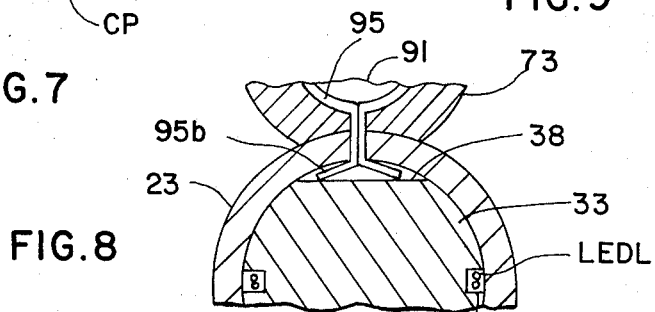
FIG.8
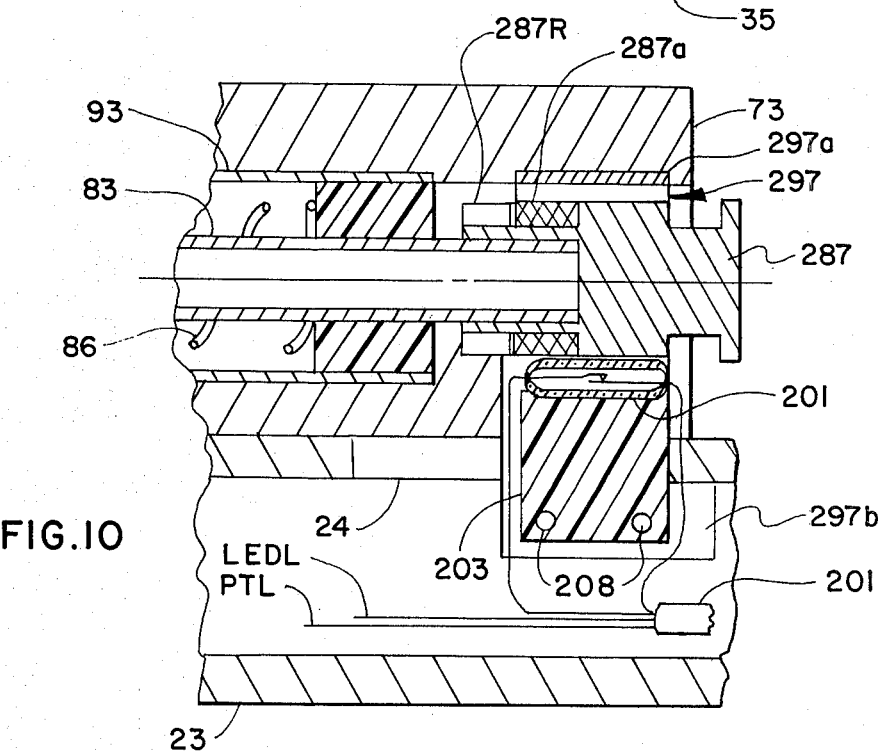
FIG.10
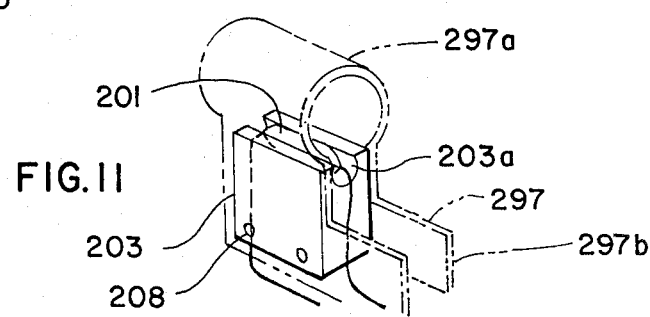
FIG.11

LENGTH PROBE WITH TRACING UNIT AND SWITCH ARRANGEMENT

This invention relates to apparatus for taking length measurements, as well as counting if desired, and more particularly to a length probe with a tracing unit and switch arrangement in which a switch is actuated as a function of depress/release action of the tracing unit.

It is desirable for various reasons to provide a length measurement probe with switch means thereon actuated when the unit is pressed against a surface. Such an arrangement may have various uses, including preventing registry of false length measurement counts when the probe is not being used or is being laid down or picked up, and as a dual function length measuring probe and item count unit in which each actuation of the switch could be used to initiate a count pulse.

It is accordingly an object and feature of this invention to provide a length probe with a tracing or marker unit and a switch which is carried thereby and is actuated from either a normally closed or normally open condition to the opposite condition as a function of pressing and releasing the tracing or marker unit. For purposes of this application and description, the terms tracing and marking are used synonymously and interchangeably as covering both a movement on a surface or the like, and/or the forming of marks during such movement, as during length measurement, and/or simply impressing onto or pressing on a surface as when a check dot or impression or a check mark or line is formed during counting.

Still other objects, features and attendant advantages will become apparent from a reading of the following detailed description of several physical embodiments, taken in conjunction with the accompanying drawings, wherein:

FIG. 1 is a perspective view of a probe arrangement according to the invention.

FIG. 2 is a perspective view of the length probe body or housing of FIG. 1.

FIG. 3 is a perspective view of the marker or tracing unit housing.

FIG. 4 is a perspective view of the nose of the length probe.

FIG. 5 is a side view of the length measurement wheel.

FIG. 6 is a fragmentary view in partial longitudinal section of the probe arrangement of FIG. 1.

FIG. 7 is a perspective view of the switch shown in FIG. 6, with a portion of the associated holder/retainer clip shown in phantom for clarity.

FIG. 8 is a partial section view taken on line 8—8 of FIG. 6.

FIG. 9 is a perspective view of the front retention clip of FIG. 8.

FIG. 10 is a fragmentary section of a modification according to the invention, employing a reed switch actuated by a magnet.

FIG. 11 is a perspective view, partly in phantom for clarity, of the switch and holder/retainer clip of FIG. 10.

FIG. 12 is a fragmentary section of a further preferred modification according to the invention, again using a reed switch actuated by a magnet.

Referring now in detail to the Figures of the Drawings, in the embodiment of FIGS. 1–9 a portable hand-held probe 11 includes a length probe 21 with a marker or tracing unit and switch arrangement 71.

The length probe 21 has a housing or main body 23 onto which marker/switch housing or main body 73 is removably secured. A nose body 33 fits in manually removable light press fit within a bore 27 formed in length probe housing 23, and carries a length measuring wheel 43 freely rotatably mounted thereon in a wheel slot 39 as by a pin 37a press fit in bore 37 and freely passing through wheel bore 47.

Housing 73 has a longitudinal concave surface 73a mating with the outer convex surface of housing 23, and is removably secured thereto through the medium of front and rear retainer clips 95 and 97. Front retainer clip 95 is disposed within a slightly enlarged shouldered counter bore 73bf at the forward end of bore 73b of housing 73, and extends through an anchor slot 29 formed in the forward open bore end of housing 23. The retainer clip 95 is spread apart at its free ends to form a retention foot 95b which is secured in place within counterbore 27b by the nose body 33. In addition, front retainer clip 95 serves in conjunction with indexing flat 38 on nose body 33 to angularly position the wheel support nose, thereby orienting the axis of wheel 43.

The rear end of housing 73 is secured to housing 23 by rear retention clip 97 which has a curved section 97a disposed in rear counter bore 73br of housing 73 and extends through slot 25 in housing 23. A retention foot 97b is formed on retainer clip 97, and extends rearward of slot 25 along and in engagement with the wall of bore 27 to thereby anchor the rear end of housing 73 to housing 23.

Wheel 43 has transverse holes formed about and inboard of its periphery at angularly equidistant intervals, which holes 45 are successively brought into alignment with transverse bore 34, 34a extending through the one-piece integral nose body 33. An infrared LED and infrared-sensitive phototransistor are disposed within bore 34 on opposite sides of wheel slot 39 in facing relation, and their lead wires LEDL and PTL extend through longitudinal side slots 35 formed in nose body 33 and connecting with bore 34. This invention is not directed to the details of the wheel movement pickup per se, and accordingly such are not shown or further described in detail. A more detailed illustration and description thereof are given in my copending application Ser. No. 62,939 for Portable Length Probe With Improved Wheel Pick-Up Arrangement, filed on this same date, to which reference is made and the specification and drawings of which are hereby incorporated by reference.

A composite lead wire 201 extends through a small bore hole at the rear of housing 23 and carries the lead wires PTL and LEDL from the phototransistor and LED respectively, as well as the lead wires from a switch 101 later to be described.

Mounted within bore 73b in housing 73 is a tracer or marker unit having a fixed outer shell 93 removably press fit within bore 73b and in-rolled to form a retention lip 93a at its forward end. A slide tube 83 fits in free sliding relation within a plastic bushing 85 press fit within body shell 93. Slide tube 83 is threadedly connected with a marker- or tracer-holding chuck split collet 89 which has normally radially resiliently outspread jaws retained in gripping relation with a marker or tracer element 81a, such as a pencil lead or a tracer ball element, by radially inward acting cam action thereon by longitudinal engagement and rearward movement thereof within collet retainer 91 with its cam end surface 91a. Collet 89 is resiliently biased rearwardly against collet retainer 91 and its cam end surface 91a through the medium of compressed compression spring 84 which acts between the rear face of retainer 91 and a mid-flange 83a formed on slide tube 83. Pressing slide tube 83 forward against the action of spring 84 will enable radially outward self-movement of the jaws of collet 89 to thereby release or enable insertion and/or adjustment of the marker, tracer, or other inserted element 81a held by collet 89.

Spring 84 is of substantially greater strength than rear compression spring 86 which extends in compressed relation between mid-flange 83a and the forward face of bushing 85, so as to assure firm gripping of the marker or tracer element 81a or the like and assure reliability of actuation of switch 101 through rearward movement of the marker or tracer element 81. The weaker rear spring serves to return the slide tube 83 with its marker or tracer element 81a or the like to the forward quiescent position shown in FIG. 6, after each depression and release of rearward pressure on the marker unit through contact with a hard surface.

Switch 101 is disposed adjacent slide tube 83 and its extension formed by rear handle 87 which is removably press fit thereon. This switch location enables the switch 101 to be actuated as a function of sliding movement of the slide tube 83 and its marker or tracer element 81a or the like. To this end, handle 87 has an annular inclined rearwardly facing cam surface 87a formed thereon and engageable with an intermediate spring lever arm 109, movement of which acts to depress exposed insulated actuator 107 protruding from the insulated case 103 of switch 101. The intermediate spring lever arm is secured as by brads 109a on switch case 103 and enables ease of adjustment of the longitudinal position at which the slide tube and handle are disposed when actuation of switch 101 is effected. Such adjustment may be accomplished through bending of spring arm 109.

Switch 101 is mounted on rear retainer clip 97 as by transverse brads 108 (see FIG. 7), and the retainer clip 97 and switch 101 thus form a separably removable composite dual purpose unit.

Switch 101 is shown in its normal condition with its snap action contact arm 105 in normally closed condition with one contact, to be opened through rearward movement of marker or tracer unit 81 with its marker or tracer element 81a, collet 89, retainer 91, slide tube 83 and handle 87 having an annular cam surface 87a, which handle cam surface 87a effects a lateral camming action on spring lever arm 109 to thereby move actuator 107 and open the normally closed contacts of switch 101. The switch 101 may be thus connected as a simple normally closed single pole switch, and used to provide automatic disablement of passage of signals from the wheel movement pickup arrangement to a counter when the switch is thus normally closed. An arrangement of this type is shown in my copending application Ser. No. 62,942 for Portable Hand-Held Length Probe With Tracing-Unit-Actuated Length Signal Output Contact Switch, to which reference is made for details thereof, and the specification and Drawings of which are hereby incorporated herein by reference.

The switch may also have alternative use, such as by employing it as a count pulse switch, where the operator desires to check off a number of points on a drawing or the like, and the marker will be depressed once for each checked point. In such case the switch 101 may be wired from only the normally open contact and the snap action contact arm thereof, if so desired, such that depression of marker 81 would effect closure of switch 101, rather than opening as in the preceding use example. Or both contacts and the contact arm may be wired in and used for a given circuit configuration, if so desired. For this reason the switch connector posts CP are all shown having lead wires, although in a given use instance only a selected two connector posts CP may be effectively wired in.

FIGS. 10 and 11 illustrate a modification of the invention, in which a magnetically actuated reed switch 201 is employed in lieu of the mechanically actuated snap-action switch 101 of FIGS. 1–9. Rear retention clip 297 replaces retention clip 97, and serves both to anchor the rear end of housing 73 and to locate the reed switch 201 which may be of conventional construction. Reed switch 201 is cradled in a plastic support 203 braded to retainer clip 297 as at 208. A ring magnet 287a is positioned in a ring groove 287r on handle 287, and serves to actuate the reed switch as a function of longitudinal sliding movement of the slide tube 83.

A further and preferred modification is illustrated in FIG. 12, in which a reed switch 301 is actuated by a magnet 387a carried by the handle 387. In this embodiment the reed switch 301 is secured, as by adhesively bonding, within a slot recess 73c formed in housing 73, with lead wires extending through a slot 325 formed in housing 23 and collected within composite lead wire 201.

Magnet 387a is mounted within the bore of handle 387 rearward of slide tube 83. This magnetically actuated reed switch modification lends itself to precise positioning and control of the switch and its actuating magnet and to simplicity and reliability of manufacture.

While the invention has been illustrated and described with respect to several illustrative physical embodiments, it will be appreciated that various further modifications and improvements may be made without departing from the scope and spirit of the invention. Accordingly, the invention is not to be limited to the particular illustrative embodiments, but only by the scope of the appended claims.

I claim:

1. A portable hand-held combination length probe, tracing unit, and switch arrangement comprising
    a length probe unit and a tracing unit secured together as a single portable hand-held probe and tracing unit,
    switch means carried by one of said length probe unit and tracing unit,
    said tracing unit having a longitudinally slidable body,
    spring means resiliently biasing said tracing unit body toward a first position, and permitting movement of said body against said spring to a second position,
    said slidable tracing unit body having switch actuator means for actuating said switch means, as a function of said tracing unit being moved from one of said positions to the other,
    cam means on said slidable tracing unit for effecting actuation of said switch means through movement of said actuator as a function of movement of said slidable tracing unit,
    and an intermediate bendable spring lever arm disposed between said cam means and said switch actuator for movement of said actuator by engagement of said cam with said spring lever arm.

2. A portable hand-held combination length probe, tracing unit, and switch arrangement comprising a length probe unit and a tracing unit secured together as a single portable hand-held probe and tracing unit, switch means carried by one of said length probe unit and tracing unit, said tracing unit having a longitudinally slidable body, spring means resiliently biasing said tracing unit body toward a first position, and permitting movement of said body against said spring to a second position, said slidable tracing unit body having switch actuator means for actuating said switch means, as a function of said tracing unit being moved from one of said positions to the other, said switch means being a self-return snap-action switch having an actuator, and cam means on said slidable tracing unit for effecting actuation of said switch means through movement of said actuator as a function of movement of said slidable tracing unit, and an intermediate bendable spring lever arm disposed between said cam means and said switch actuator for movement of said actuator by engagement of said cam with said spring lever arm.

3. A portable hand-held combination length probe, tracing unit, and switch arrangement comprising a length probe unit and a tracing unit secured together as a single portable hand-held probe and tracing unit, switch means carried by one of said length probe unit and tracing unit, said tracing unit having a longitudinally slidable body, spring means resiliently biasing said tracing unit body toward a first position, and permitting movement of said body against said spring to a second position, said slidable tracing unit body having switch actuator means for actuating said switch means, as a function of said tracing unit being moved from one of said positions to the other, said tracing unit having a chuck collet and a longitudinally slidable chuck collet retainer within which said collet is also selectively slidable, further spring means normally resiliently holding said collet in closed condition within said retainer, a slide tube secured to said collet for concurrent sliding movement together, shoulder means on said tube intermediate its ends and against which said spring means and said further spring means act in opposing directions, a stationary bushing slidably carrying said slide tube, stop means forward of said collet retainer for limiting forward movement of said collet retainer, said first-mentioned spring means being disposed between said shoulder means and said bushing and being substantially weaker than said further spring means, said further spring means being forward of said shoulder means and acting in compression between said shoulder means and said collet retainer and being stronger than said first-mentioned spring means, whereby rearward axial pressure on said collet will effect rearward movement of said tube through compression of said weaker rear spring means, while forward axial pressure on the rear of said tracing unit will effect compression of said stronger foward spring to thereby push said collet through said collet retainer.

4. A portable hand-held combination length probe, tracing unit, and switch arrangement, according to claim 3, said tracing unit further including a tubular shell within which said collet retainer is slidably mounted, said tubular shell having an inturned forward end section forming said stop means for said collet retainer.

5. A portable hand-held combination length probe, tracing unit, and switch arrangement, according to claim 3, said switch actuator means comprising an annular cam surface on the rear portion said slidable tracing unit 6. A portable hand-held combination length probe, tracing unit, and switch arrangement comprising a length probe unit and a tracing unit secured together as a single portable hand-held probe and tracing unit, switch means carried by one of said length probe unit and tracing unit, said tracing unit having a longitudinally slidable body, spring means resiliently biasing said tracing unit body toward a first position, and permitting movement of said body against said spring to a second position, said slidable tracing unit body having switch actuator means for actuating said switch means, as a function of said tracing unit being moved from one of said positions to the other, said length probe and said tracing unit each having a housing section stationary relative to one another, and a forward retention clip adjacent to the forward end zone of said tracing unit housing and extending through a slot in said tracing unit housing into engagement with an anchor portion of said length probe.

7. A portable hand-held combination length probe, tracing unit, and switch arrangement, according to claim 6, said length probe comprising a housing having a hollow bore therein open at its forward end, a nose body slidably removably disposed within said forward bore end of said length probe housing and forming said anchor portion of said length probe, said nose body having an undercut indexing flat thereon engaging said retention clip in substantially angularly anchored relation.

8. A portable hand-held combination length probe, tracing unit, and switch arrangement, according to claim 1, said length probe and said tracing unit each having a housing section stationary relative to one another, said length probe housing having a slot therein, and a rear retention clip adjacent the rear end zone of said tracing unit housing and extending through said slot in said length probe housing, said rear retention clip having a rearwardly extending retention foot extending into said length probe housing and behind said slot to longitudinally and laterally anchor the rear end of said tracing unit housing to said length probe housing.

9. A portable hand-held combination length probe, tracing unit, and switch arrangement, according to claim 8,
said switch means and rear retention clip being secured together as a discrete separable unit.

10. A portable hand-held combination length probe, tracing unit, and switch arrangement, according to claim 9,
and a forward retention clip adjacent to the forward end zone of said tracing unit housing and extending through a slot in said tracing unit housing into engagement with an anchor portion of said length probe.

11. A portable hand-held combination length probe, tracing unit, and switch arrangement, according to claim 10,
said length probe comprising
a housing having a hollow bore therein open at its forward end,
a nose body slidably removably disposed within said forward bore end of said length probe housing and forming said anchor portion of said length probe,
said nose body having an undercut indexing flat thereon engaging said retention clip in substantially angularly anchored relation.

12. A portable hand-held combination length probe, tracing unit, and switch arrangement, according to claim 8,
said switch means and rear retention clip being secured together as a discrete separable unit.
said switch means being a self-return snap-action switch having an actuator,
and cam means on said slidable tracing unit for effecting actuation of said switch means through movement of said actuator as a function of movement of said slidable tracing unit.

13. A portable hand-held combination length probe, tracing unit, and switch arrangement, according to claim 12,
and an intermediate bendable spring lever arm disposed between said cam means and said switch actuator for movement of said actuator by engagement of said cam with said spring lever arm.

14. A portable hand-held combination length probe, tracing unit, and switch arrangement, according to claim 8,
said switch means and rear retention clip being secured together as a discrete separable unit,
said switch means comprising a magnetically actuated switch,
and magnetic field generating means on said tracing unit longitudinally slidable body and which is movable into and out of switch-actuating position relative to said switch means as a function of back-and-forth longitudinal sliding motion of said slidable body.

15. A portable hand-held combination length probe, tracing unit, and switch arrangement, according to claim 14,
said switch means comprising a magnetically actuated reed switch,
said magnetic field generating means being a permanent magnet on said tracing unit longitudinally slidable body.

16. A portable hand-held combination length probe, tracing unit, and switch arrangement, according to claim 15,
said slidable tracing unit body including a main slide tube and a rear handle,
said rear handle being press fit onto said main slide tube,
said spring means extending about said main slide tube,
said permanent magnet being secured to said rear handle.

17. A portable hand-held combination length probe, tracing unit, and switch arrangement, according to claim 16,
said rear handle having a central bore within which said permanent magnet is mounted.

18. A portable hand-held combination length probe, tracing unit, and switch arrangement, according to claim 17,
said rear handle having a ring groove,
said permanent magnet being a ring magnet mounted on said ring groove.

19. A portable hand-held combination length probe, tracing unit, and switch arrangement comprising
a length probe unit and a tracing unit secured together as a single portable hand-held probe and tracing unit,
switch means carried by one of said length probe unit and tracing unit,
said tracing unit having a longitudinally slidable body,
spring means resiliently biasing said tracing unit body toward a first position, and permitting movement of said body against said spring to a second position,
switch actuator means carried by one of said length probe and said slidable tracing unit body, for actuating said switch means as a function of said tracing unit being moved from one of said positions to the other,
said switch means comprising a magnetically actuated switch,
said switch actuator means comprising magnetic field generating means on the other one of said length probe and tracing unit longitudinally slidable body,
one of said magnetically actuated switch and magnetic field generating means being movable relative to the other one of said magnetically actuated switch and magnetic field generating means into and out of switch-actuating position as a function of back-and-forth longitudinal sliding motion of said slidable body.

20. A portable hand-held combination length probe, tracing unit, and switch arrangement, according to claim 19,
said switch means comprising a magnetically actuated reed switch,
said magnetic field generating means being a permanent magnet on said tracing unit longitudinally slidable body.

21. A portable hand-held combination length probe, tracing unit, and siwtch arrangement, according to claim 20,
said slidable tracing unit body including a main slide tube and a rear handle,
said rear handle being press fit onto said main slide tube,
said spring means extending about main slide tube, said permanent magnet being secured to said rear handle.

22. A portable hand-held combination length probe, tracing unit, and switch arrangement, according to claim 21,
said rear handle having a central bore within which said permanent magnet is mounted.

23. A portable hand-held combination length probe, tracing unit, and switch arrangement, according to claim 21,
said rear handle having a ring groove,
said permanent magnet being a ring magnet mounted on said ring groove.

* * * * *